(12) United States Patent
Kobayashi

(10) Patent No.: US 7,346,046 B2
(45) Date of Patent: Mar. 18, 2008

(54) LAN COMMUNICATION METHOD AND SYSTEM FOR TRANSMITTING AND RECEIVING PACKETS WITH CORRECTION CODE DATA

(75) Inventor: Yoshikazu Kobayashi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 841 days.

(21) Appl. No.: 10/669,649

(22) Filed: Sep. 25, 2003

(65) Prior Publication Data

US 2004/0088643 A1    May 6, 2004

(30) Foreign Application Priority Data

Sep. 27, 2002 (JP) ............... 2002-282518

(51) Int. Cl.
*H04L 12/66* (2006.01)
*H04L 12/28* (2006.01)
*H03M 13/00* (2006.01)
*G06F 11/00* (2006.01)
*H04J 3/16* (2006.01)
*H04J 3/04* (2006.01)

(52) U.S. Cl. ............ 370/352; 370/389; 370/465; 370/535; 714/752; 714/2

(58) Field of Classification Search ............ None
See application file for complete search history.

(56) References Cited

U.S. PATENT DOCUMENTS

| 4,766,599 | A | 8/1988 | Miyazaki |
| 6,434,606 | B1 * | 8/2002 | Borella et al. ............ 709/214 |
| 6,438,105 | B1 * | 8/2002 | Qarni et al. ............ 370/231 |
| 7,039,716 | B1 * | 5/2006 | Jagadeesan ............ 709/236 |
| 7,042,833 | B1 * | 5/2006 | George et al. ............ 370/216 |
| 2004/0215812 | A1 * | 10/2004 | Lu ............ 709/233 |

FOREIGN PATENT DOCUMENTS

| JP | 06-112874 A | 4/1994 |
| JP | 11-177623 A | 7/1999 |
| JP | 2001-86164 A | 3/2001 |
| JP | 2002-162998 A | 6/2002 |
| JP | 2002-221994 A | 8/2002 |
| JP | 2003-249957 A | 9/2003 |
| WO | WO 02/15548 A2 | 2/2002 |

OTHER PUBLICATIONS

S. Udani et al., "Overview of Voice Over IP", University of Pennsylvania Technical Report MS-CIS-01-31, Feb. 2001.

* cited by examiner

*Primary Examiner*—Huy D. Vu
*Assistant Examiner*—Nittaya Juntima
(74) *Attorney, Agent, or Firm*—Sughrue Mion, PLLC

(57) ABSTRACT

When transmitting voice data, correction codes each representing data of one data packet are added to the transmitted data from the outset. Thus, it is made possible to restore one data packet lost for the first time, and when and only when two successive data packets are discarded, one packet data is lost. In this way, the data discarding endurance is improved.

6 Claims, 7 Drawing Sheets

FIG.3
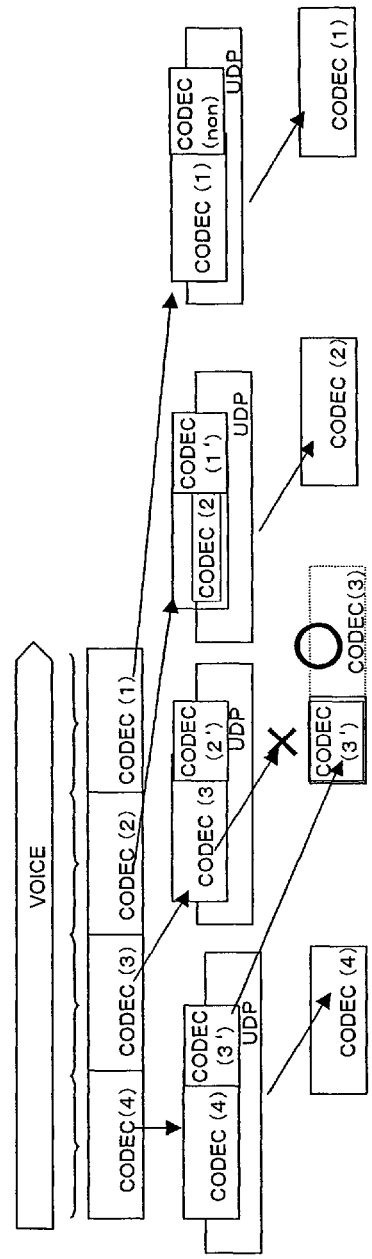
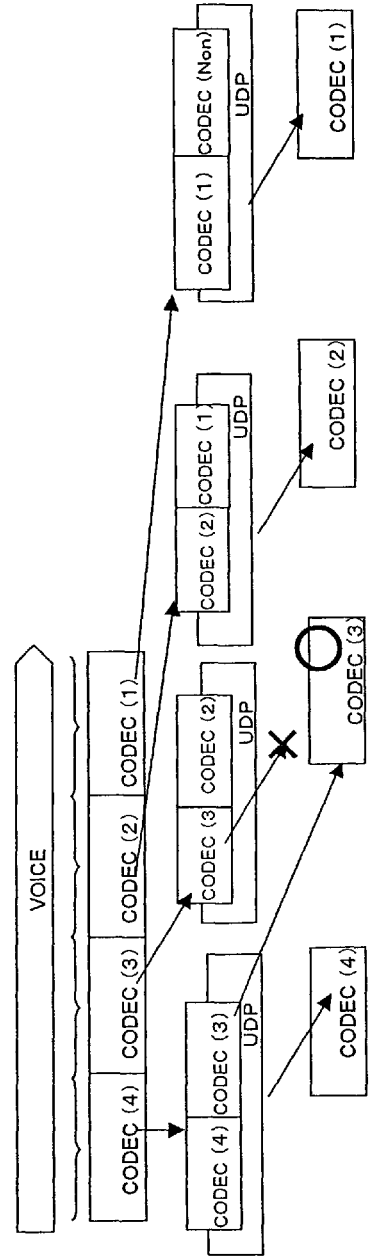

LAN COMMUNICATION METHOD AND SYSTEM FOR TRANSMITTING AND RECEIVING PACKETS WITH CORRECTION CODE DATA

BACKGROUND OF THE INVENTION

This application claims benefit of Japanese Patent Application No. 2002-282518 filed on Sep. 27, 2002, the contents of which are incorporated by the reference.

The present invention relates to a LAN communication method in which a transmitting side system successively sends out data packets representing data of the subject of transmission to LAN, and a receiving side system receives these data packet via the LAN, and a LAN communication system for executing the same method.

In a system for electric communication inclusive of LAN communication, usually it is sought to secure a standard of QoS (i.e., quality of service, that is, the function of communication quality control, technique for realizing this function or general term of such function and technique). To meet this general demand, various techniques have been proposed.

However, few methods or systems have heretofore been proposed, which are sufficiently useful for realizing data packet discarding endurance improvement in voice communication as LAN communication, particularly, wireless LAN communication, in such a manner that the QoS is maintained irrespective of data packet discarding.

Particularly, in specific method or system has been proposed, which is based on a concept that in the event of data packet discarding, the discarded data can be reproduced without need of waiting re-sending of any data packet or packets but on the basis of data in the pertinent data packet or packets.

SUMMARY OF THE INVENTION

An object of the present invention, therefore, is to provide a LAN communication method and system, in which the QoS is maintained such that in the event of data packet discarding in LAN communication inclusive of wireless LAN communication, the discarded data can be reproduced without need of waiting the re-sending of any data packet but on the basis of data in the pertinent data packet or packets, and a LAN communication system for executing the same method.

Another object of the present invention is therefore to provide a LAN communication method and system, which has such high data discarding endurance that, in the event of occurrence of data discarding in the stage of data transmission, the original data can be reconstructed without waiting re-transmission of any data packet.

According to an aspect of the present invention, there is provided a LAN communication method, wherein: in a transmitting side system, when sending out data packets representing data as the subject of transmission, multiplexed CODEC data packets each including a data packet representing data in one time section and a correction code representing a correction code of a predetermined data packet in a time section retroactive to the afore-said time section by a time interval corresponding to a predetermined frame number are formed and sent out; and in a transmitting side system, the multiplexed CODEC data packets are received as a data packet group and, when data packet discarding has occurred, the data as the subject of transmission is reconstructed on the basis of a correction code in the pertinent CODEC data packet without waiting re-transmission of any CODEC data packet.

According to another aspect of the present invention, there is provided a LAN communication method, wherein in a transmitting side system, when sending out data packets representing data as the subject of transmission to a corresponding receiving side system via wireless LAN, multiplexed CODEC data packets each including a data packet representing data in one time section and a correction code representing data of a predetermined data packet in a time section retroactive to the afore-said one time section by a time interval corresponding to a predetermined frame number are formed and sent out.

According to other aspect of the present invention, there is provided a LAN communication method, wherein in a receiving side system multiplexed CODEC data packets, which are formed in the corresponding transmitting side system and each include a data packet representing data in one time section and a correction code representing a predetermined data packet in a time section retroactive to the afore-said one time section by a time interval corresponding to a predetermined frame number, are received as a data packet group and, when data packet discarding has occurred, data as the subject of transmission is reconstituted based on the correction code in the CODEC data packet without waiting re-transmission of any CODEC data packet.

According to still other aspect of the present invention, there is provided a LAN communication system comprising: a transmitting side system, in which when sending out data packets representing data as the subject of transmission to LAN, multiplexed CODEC data packets each including a data packet representing data of one time section and a correction code representing data of a predetermined data packet in a time section retroactive to the afore-said one time section by a time interval corresponding to a frame number are formed and sent out; and a receiving side system, in which in the event of data packet discarding has occurred when the multiplexed CODEC data packets are received as a data packet group, data as the subject of transmission is reconstructed on the basis of a correction code in the pertinent CODEC data packet without waiting re-transmission of any CODEC data packet.

According to other aspect of the present invention, there is provided a LAN communication system comprising a transmitting side system, which is arranged such that when sending out data packets representing data for transmission to a corresponding receiving side system to LAN, multiplexed CODEC data packets each including a data packet representing data in one time section and a correction code representing data of a predetermined data packet in a time section retroactive to the aforesaid one time section by a time interval corresponding to a predetermined frame number are formed and sent out.

According to still other aspect of the present invention, there is provided a LAN communication system comprising a receiving side system, wherein multiplexed CODEC data packets, which are formed in a corresponding transmitting side system and each include a data packet representing data in one time section and a correction code representing data of a predetermined data packet in a time section retroactive to the afore-said one time section by a time interval corresponding to a predetermined data frame number, are received as a data packet group and, when data packet discarding has occurred, data as the subject of transmission is reconstructed on the basis of the correction code in the pertinent CODEC data packet without waiting re-transmission of any CODEC data packet.

According to further aspect of the present invention, there is provided a LAN communication system comprising: a transmitting side system including: a voice signal input part for inputting data to be sent out to LAN; a transmitting side CODEC part for converting signal representing the data inputted from the voice signal input part to digital codes; a transmission buffer part including a data buffer part for temporarily storing CODEC data packets of the digital codes generated in the transmitting side CODEC part until the CODEC data packet is sent out to the LAN and a plural CODEC data multiplexing part for multiplexing a predetermined plurality of CODEC data packets to form transmission data; and a transmitting part for receiving the multiplexed transmission data from the transmission buffer and sending out the received transmission data to LAN; and a receiving side system including: a receiving part for receiving the transmission data from the LAN; a reception buffer part including a plural CODEC packet decoding part for developing the multiplexed transmission data received in the receiving part and rearranging the developed data to a continuous data train and a jitter data buffer part for temporarily storing data from the plural CODEC packet decoding part; a receiving side CODEC part for receiving and decoding the digital data from the reception buffer part; and an output part for reconstructing and outputting data reconstructed in the receiving side CODEC part.

According to still further aspect of the present invention, there is provided a LAN communication system comprising a transmitting side system including: an input part for inputting signal representing data to be sent out to LAN; a transmitting side CODEC part for converting the signal representing data inputted from the input part to digital codes; a transmission buffer part including a data buffer part for temporarily storing CODEC data packets of digital codes generated in the transmitting side CODEC part until the CODEC data packets are sent out to the LAN, and a plural CODEC data multiplexing part for multiplexing a predetermined plurality of CODEC data packets to form transmission data; and a transmitting part for receiving the multiplexed transmission data from the transmission buffer part and sending out the received transmission data to the LAN.

According to further aspect of the present invention, there is provided a LAN communication system including a receiving side system including: a receiving part for receiving transmission data from corresponding LAN; a reception buffer part including a plural CODEC packet decoding part for developing transmission data of multiplexed a predetermined plurality of CODEC data packets which is received in the reception part, and rearranging the developed transmission data, rearranging the sequence order of the data packets and rearranging the data packets to a continuous data train, and a jitter data buffer part for temporarily storing data from the plural CODEC packet decoding part; a receiving side CODEC part for receiving and decoding digital jitter from the reception buffer part; and an output part for reconstructing and outputting data obtained by decoding in the receiving side decoding part.

The LAN communication system further comprises a simultaneous transmission packet number setting part for setting the number of CODEC data packets to be multiplexed in the plurality of CODEC multiplexing part in the transmitting side system. The LAN communication system which further comprises a simultaneous transmission packet setting part for setting the number of CODEC data packets to be multiplexed in the plural CODEC data multiplexing part. In the LAN communication system the receiving side system further includes a CODEC packet non-arrival factor computing part for computing the non-arrival factor of CODEC data packet number as a ratio of the number of data packets processed as data non-arrival concerning CODEC data obtained by sequentially arranging in the reception buffer part to the full transmitted data packet number and informing a simultaneous transmission packet number change request to the simultaneous transmission packet number setting part in the transmitting side system on the basis of the comparison of the computed non-arrival factor and a predetermined reference value.

According to further aspect of the present invention, there is provided a LAN communication system comprising: a transmitting side system including: an input part for inputting data to be sent out to LAN; a transmitting side CODEC part for converting signal representing data inputted from the input part to digital signal; a transmission buffer part including a data buffer part temporarily storing CODEC data packets of digital codes generated in the transmitting side CODEC part and a plural CODEC data multiplexing part for multiplexing a predetermined plurality of CODEC data packets to form transmission data; a simultaneous transmission packet number setting part for setting the number of CODEC data packets to be multiplexed in the plural CODEC data multiplexing part in response to a request command from a receiving side system corresponding to the transmitting side system; and a transmitting part for receiving multiplexed transmission data from the transmission buffer part to send to the LAN; and the receiving side system including: a receiving part for receiving transmission data from the LAN; a reception buffer part having a plural CODEC packet decoding part for developing the multiplexed transmission data received from the receiving part, rearranging the sequential order of the developed data packets and rearranging the data packets to form a continuous data train, and a jitter data buffer part for temporarily storing data from the plural CODEC packet decoding part; a simultaneous reception packet number setting part for setting a number of packets to be dealt with in the plural CODEC packet decoding part as belonging to the same time frame and being received simultaneously, recognizing the number of CODEC data packets to be multiplexed, as set in the simultaneous transmission packet number setting part in the transmitting side system, on the basis of the data received in the receiving part, recognizing the number of CODEC data packets, which are among a plurality of multiplexedly transmitted CODEC data packets and, belong to the same time frame and are actually simultaneously received, on the basis of the data received in the receiving part and, when the degree of failure of meeting of the transmitted CODEC data packet number by the actually received CODED data packets, issuing a command for reducing the number of CODED data packets to be multiplexed as a request command to be issued to the simultaneous transmission packet setting part on the transmitting side; a receiving side CODEC part for receiving and decoding digital data from the reception buffer part; and an output part for reconstructing and outputting data obtained by decoding in the receiving side CODED part.

According to still further aspect of the present invention, there is provided a LAN communication system comprising: a transmitting side system including: an input part for inputting data to be sent out to LAN: a transmitting side CODEC part for converting signal representing data inputted from the input part to digital signal to form CODEC data and performing conversion to packets in predetermined time intervals; a transmitting side CODEC packet conversion timing setting part for setting the time interval of packet conversion of CODEC data in the transmitting side CODEC part in response to a request for setting from a receiving side system corresponding to the transmitting side system; a transmission buffer part including a data buffer part for temporarily storing CODEC data packet of digital codes generated in the transmitting side CODED part and a plural CODEC data multiplexing part for multiplexing a predetermined plurality of CODEC data packets to form transmission data; a simultaneous transmission packet number setting part for setting the number of CODEC data packets to be multiplexed in the plural CODEC data multiplexing part in response to a request command from the receiving side system corresponding to the transmitting side system; and a transmitting part for receiving the multiplexed transmission data from the transmission buffer part and sending out the received data to the LAN; and the receiving side system comprising: a receiving part for receiving multiplexed transmission data from the LAN; a reception buffer part including a plural CODEC packet decoding part for developing the multiplexed transmission data received in the receiving part, arranging the obtained data packets in sequence order and rearranging these data packets to form a continuous data train, and a jitter data buffer part for temporarily storing data from the plural CODEC packet decoding part; a simultaneous reception packet number setting part for setting the number of data packets to be dealt with in the plural CODEC packet decoding part as data packets belonging to the same time frame and received simultaneously; a CODEC packet non-arrival factor computing part for computing the non-arrival factor of CEDEC data packet number as the ratio of the number of data packets processed as data non-arrival regarding CODEC data obtained by sequential rearranging in the reception buffer part to the total transmitted data packet number, informing, when the non-arrival factor exceeds a predetermined reference value, a request for increasing the simultaneous transmission packet number to the simultaneous transmission number setting part in the transmitting side system, and issuing a packet conversion timing time interval setting request for causing the transmitting side CODEC part to set the CODEC data packet conversion time interval according to the non-arrival factor; a receiving side CODEC packet conversion timing setting part for issuing, when receiving the packet conversion timing time interval setting request from the CODEC packet non-arrival factor computing part, the setting request to the transmitting side CODEC packet conversion timing setting part; a receiving side CODEC part for receiving and decoding digital data from the reception buffer part; and an output part for reconstructing and outputting the data obtained by decoding in the receiving side CODEC part.

According to further aspect of the present invention, there is provided a LAN communication system according to claim 14, wherein the CODEC packet non-arrival factor computing part has an arrangement having a table, which prescribes packet conversion time intervals of applied CODEC data determined based on the non-arrival factor and issuing packet timing time interval setting request according to the table data.

In the LAN communication system when the transmitting side CODEC packet conversation timing setting part sets the CODEC data packet conversion time interval in response to a setting request from the receiving side system corresponding to the transmitting side system, it sends out a time setting request reception success information to the receiving side at the success time.

The LAN communication system further comprises a preliminary data re-compressing part for supplying data obtained by a re-compressing process with a compression factor corresponding to the pertinent data to the plural CODEC data multiplexing part in the transmission buffer part on the basis of a table, in which compression factor to be applied are stored in correspondence to sequence systems of a plurality of CODED data packets, and a preliminary data re-compression decoding part for executing a re-compression decoding process corresponding to the recompression process in the preliminary data re-compressing part on data processed in the plural CODEC data packet decoding part in the reception buffer part.

Other objects and features will be clarified from the following description with reference to attached drawings.

BRIEF DESCRIPTION OF THE DRAWINGS

FIG. 3 is a view showing the manner of voice data transmission in the FIG. 2 embodiment;

PREFERRED EMBODIMENTS OF THE INVENTION

Figure 1:
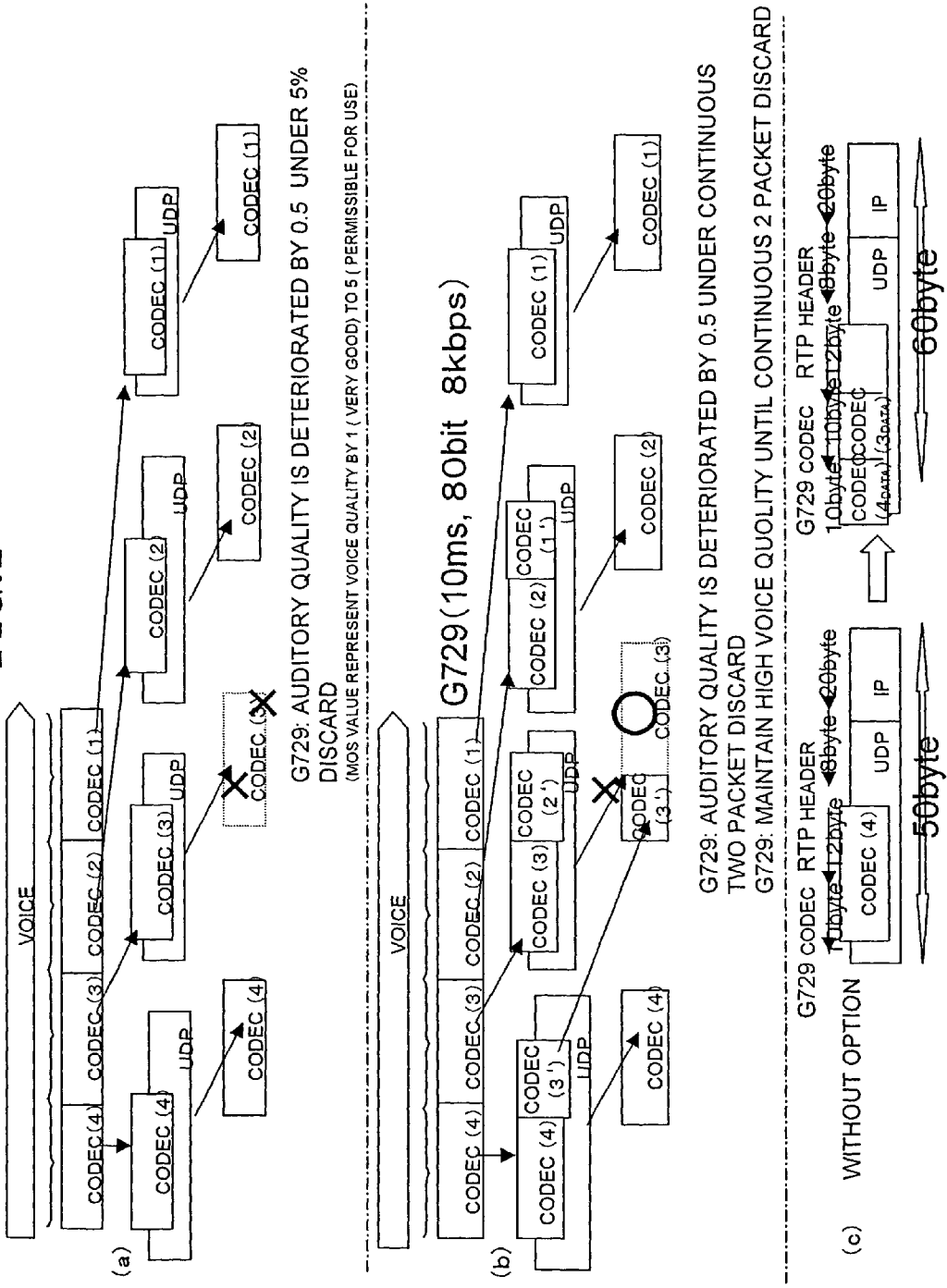
FIG. 1 is a view for describing features of the communication system according to the present invention.

Preferred embodiments of the present invention will now be described with reference to the drawings.

A general explanation of the LAN communication system as a preamble communication system according to the present invention, in which a transmitting side system successively sends out data packets representing data of the subject of transmission to LAN, and a receiving side system receives these data packets via the LAN, and a LAN communication system for executing the same method, and also a brief description of the principles underlying the present invention, will now be given.

A typical example of data as the subject of communication is voice data. In this case, the data are converted to data packets by a voice communication application called RTP, and these data packets are sent out in UDP frames and IP frames to a LAN interface.

RTP is an abbreviation of real-time transport protocol for streaming transmission of audio and video data prescribed in RFC 1889, and usually UDP is used as a transport layer protocol.

UDP is an abbreviation of user datagram protocol, which is a member of a TCP/IP group and is located in the same transport layer rank as the TCP. In this protocol, connection-free communication is made, in which individual data packets are carried forth independently without execution of re-sending process at the time of error occurrence, flow control, sequence control, etc.

IP is an abbreviation of internet protocol, which is a member of the TCP/IP group and is corresponding to the network layer. Data flowing the internet such as www and mails, are all carried forth in the IP.

In the wireless LAN, usually actual efficiency of data is low; in a system of 11 Mbps in IEEE 802.11b, with a short packet (i.e., a packet shorter than a packet length prescribed in the standards, which is a sort of error packet generated by a collision in Ethernet (a registered trademark), the actual efficiency is lower than 1 Mbps. Therefore, a problem is posed that the data packet discarding factor is higher than in the wired LAN.

According to the present invention, in order to obtain voice data replica or reproduce voice data in the case of occurrence of data packet discarding, a voice code replica code representing voice data at a time retroactive by a time interval corresponding to a predetermined frame number is added. With this arrangement, in the case of occurrence of some data packet discarding a voice replica is obtainable by using such vice code replica code.

By way of example, in a system based on recommendation by ITU-T called G. 729, which is used in VoIP, voice is coded at 8 kbits/sec by using CS-ACELP system. A voice code in this system is an 8 kbps data stream.

VoIP is an abbreviation of voice over IP, which is a general term of techniques, in which voice signal is sent out by utilizing an IP network such as internet or intranet. Specifically digitally coded voice data is divided in every constant time interval and converted to data packets to be carried forth in IP datagram.

FIG. 1 is a view for describing features of the communication system according to the present invention. In part (a) in FIG. 1, a problem encountered in voice data transmission in a general communication system as a preamble of the present invention. A strip-like arrow "voice" drawn in an upper area of the part (a), represents analog or digital voice signal or data, which is continuous in time. Underneath this showing, data packets obtained by predetermined signal conversion or data process, which is executed as CODEC circuit or process for individual time sections shown in parentheses, are shown with annexed numbers in parentheses in the preceding-in-time order as "CODEC (4)", "CODEC (3)", "CODEC (2)", "CODEC (1)", . . . These data packets are voice packets. As noted above, "CODEC" in the showing in the individual drawing represents data packets (which are processed data other than such processes of coding/decoding and compression/de-compression. These voice packets are generated one packet in each 10 msec. as "CODEC" in the sense noted above that they are obtained by conversion to UDP packets. In the illustrated example, packet discarding has occurred with respect to "CODED (3)", which has been obtained by UDP packet conversion and sent out (labeled "x" being a representation of a data packet, with respect to which data packet discarding has occurred). With the occurrence of such packet discarding, the voice quality evaluation value in five-stage evaluation from "1" (very good) to "5" (permissible for use although very bad) is reduced by 0.5.

Part (b) in FIG. 1 schematically shows a measure against the above problem according to the present invention. In this part, the same symbolic representation is made as in the part (a) is used. Specifically, a strip-like arrow "voice" drawn in an upper area of the part (b) represents analog or digital voice signal or data, which is continuous in time. Underneath this showing, data packets obtained by a predetermined signal conversion or data process, which is executed in CODEC circuit or process for individual time sections shown in parentheses, are shown in the preceding-in-time order with annexed numbers in parentheses as "CODEC "(4), "CODEC (3)", "CODEC (2)" and "CODEC (1)", . . . These data packets correspond to voice packets.

While these voice packets are generated as "CODEC" in the sense as described before as UDP packets, in the system, or method according to the present invention, particularly in the UDP packet formation, multiplexed CODEC data packets, which each include a data packet representing data in one time section and a correction code representing data of a predetermined packet in a time section retroactive to the time section noted above by a time interval corresponding to a predetermined frame number, are formed and sent out. In the illustrated example, with respect to "CODEC (4)", "CODEC (3')" which is a data packet representing voice data in the next time section (3) (more stringenty a data packet having sufficient data for compensation or interpolation for the discarded data packet although the voice quality is more or less deteriorated by compression process), is multiplexed as correction code to form CODEC data packet "CODEC (4)/CODEC (3')". Likewise, multiplexed CODEC data packets "CODEC (3)/CODEC (2')" and "CODEC (2)/CODEC (1')" are formed. Like the case of the part (a) described above, when data packet discarding occurs with respect to "CODED (3)" (labeled "x" being a representation of a data packet, with respect to which data packet discarding has occurred), a replica of data as the subject of transmission is formed on the basis of a correction code in the pertinent multiplexed CODEC data packet "CODED (4)/CODED (3')" (i.e., part of "CODED (3')" in the multiplexed CODEC data packet) without waiting the re-sending of the CODEC data packet concerning the discarding (labeled "○" being a representation of the data packet replica obtained by compensating for the data packet discarding with the correction code). It will be seen that voice data are sent by adding correction codes each representing data of one data packet from the outset, whereby replica of one lost data packet can be obtained. One data packet is lost when and only when discarding of two successive data packets occurs. In this way, the MOS value (i.e., five-step evaluation value) can be held within a deterioration of 0.5 until the probability of occurrence of the discarding of two successive data packets becomes 5%.

Part (c) in FIG. 1 schematically represents the above way of sending out data packet with added correction codes. In this case, as for the data length of VoIP packet, even by adding full size data of one data packet taking 10 msec., the data length change is merely from 50 bytes to 60 bytes, and the data length is not substantially different from the maximum length of 1,500 bytes of Ethernet, and communication efficiency reduction is hardly possible.

Summarizing the subject matter of the present invention as described above in connection with the example with voice data as the subject of transmission, it is a LAN communication method, in which when sending out data packets representing data as the subject of transmission to LAN, a transmitting side system forms and sends out multiplexed CODEC data packets, which each includes a data packet representing data in one time section and a correction code representing data of a predetermined data packet in a time section retroactive to the above time section by a time interval corresponding to a predetermined frame number, and a receiving side system receives the multiplexed CODED data packets as a data packet collection and, in the event of occurrence of data packet discarding, forms a replica of data as the subject of transmission on the basis of the correction code in the pertinent CODEC data packet without waiting the sending of any CODED data packet.

Figure 2:
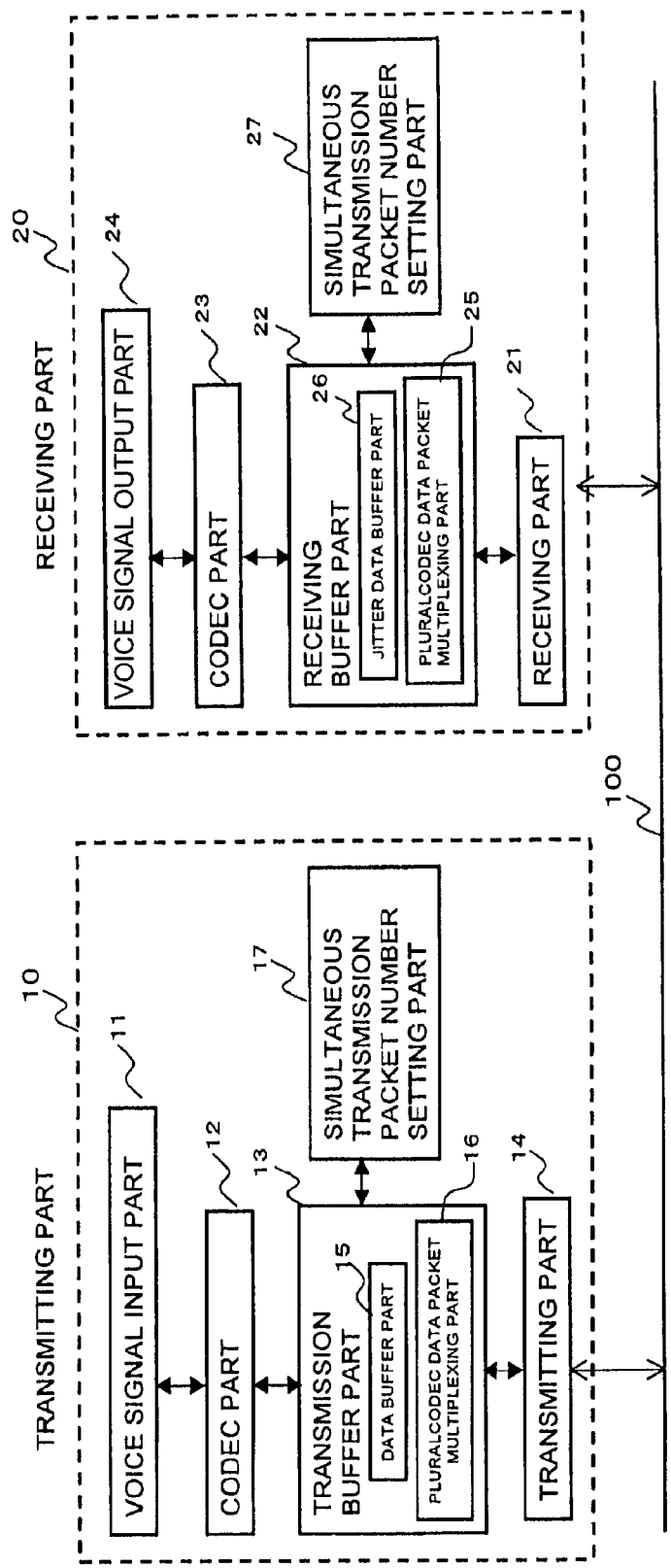
FIG. 2 is a block diagram showing a LAN communication system embodying the present invention.

FIG. 2 is a block diagram showing a LAN communication system embodying the present invention. The transmitting side system (or transmitting part) includes a CODEC part for sending out voice CODEC, and the receiving side system (or receiving part) includes a CODEC part corresponding to the transmitting side CODEC part.

In the embodiment shown in FIG. 2, the transmitting part 10 which sends out multi-media data representing voice, comprises a voice signal input part for inputting voice signal to LAN 100, a voice signal input part 11 for inputting voice signal, a CODEC part 12 for converting signal inputted from the voice signal input part 11 to digital signal, a CODEC part 12 for converting signal inputted from the voice signal input part 11 to digital signal, a transmission buffer part 13 for temporarily storing a data packet of digital code generated in the CODEC part 12 until the data packet is sent out to the LAN, and a transmitting part 14 for receiving the transmission data from the transmission buffer part 13 and sending the received data to the LAN 100.

The transmission buffer part 13 includes a data buffer part 15 for temporarily storing the data packet received from the CODEC part 12 until the data packet is sent out to the LAN, and a plural CODEC data packet multiplexing part 16 for multiplexing a predetermined number of CODEC packets. The plural CODEC packet multiplexing part 16 is coupled to a simultaneous transmission packet number setting part 17, which sets the number of CODEC packets to be multiplexed.

The receiving part 20 corresponding to the transmitting part 10 comprises an input receiving part 21 for receiving data from the LAN 100, a reception buffer part 22 for storing multi-media data received from the input receiving part 21, arranging the received data to be in a predetermined order to obtain a continuous data train and temporarily holding the data train thus formed, a CODEC part 23 for receiving and decoding digital data from the reception buffer part 22, and a voice signal output part 24 for reproducing voice data decoded in the CODEC part 23.

The reception buffer part 22 successively receives a predetermined number of data packets as a multiplexed packet group. The number of the multiplexed packets is set according to the data supplied from the simultaneous reception packet number setting part 27, which is coupled to the reception buffer part 22. The reception buffer part 22 includes a plural CODEC packets decoding part 25, which develops and rearranges the received data packets according to the fashion of multiplexing, and a jitter data buffer part 26. The reception buffer part 22 in this embodiment has a function of constructing and receiving a plurality of CODEC packets as a single voice packet and, in the event of occurrence of data packet discarding in voice data transmission, can reproduce or reconstruct voice without waiting data re-transmission from the transmitting side system 10. Thus, it is possible to provide decoded data free from voice quality deterioration due to data packet discarding.

FIG. 3 is a view showing the manner of voice data transmission in the FIG. 2 embodiment. In the Figure, the same symbolic representation is made as in the part (a) described above. The strip-like arrow "voice" drawn in the upper half of FIG. 3 represents analog or digital voice signal or data which is continuous in time. Underneath this showing, data packets obtained after predetermined signal conversion or data process, are shown for time sections in parentheses, respectively, with annexed numbers in parentheses in the preceding-in-time order as "CODEC (4)", "CODEC (3)", "CODEC (2)" and "CODEC (1)". These data packets correspond to voice packets. These voice packets are generated as "CODEC" in the above sense that they are obtained by conversion to UDP packets. In the system or method according to the present invention, particularly in the UDP packet conversion, multiplexed CODEC data packets are formed such that each includes a data packet representing data in one time section and a correction code representing data of a predetermined data packet in a time section retroactive to the above time section by a time interval corresponding to a predetermined number of frames, are formed and sent out. In the illustrated example, with respect to CODEC (4), CODEC data packet "CODEC (4)/CODEC (3')" is formed by multiplexing with the above "CODEC (3')" used as the correction code. Likewise, multiplexed CODEC data packets "CODED (3)/CODEC (2')" and "CODEC (2)/CODEC (1')" are formed. Like the above case, in the event of occurrence of data packet discarding with respect to "CODEC (3)" (labeled "x" being the data packet pertinent to the data packet discarding), a replica of data as the subject of transmission is obtained on the basis of the correction code in the pertinent CODEC data packet ("CODEC (4)/CODEC (3')") (i.e., part "CODEC (3')" in the multiplexed CODED data packet) without waiting re-transmission of the CODED data packet concerning the discarding (labeled "○" being the data packet reconstructed for compensating for the discharging with the correction symbol). It will be seen that in the system shown in FIG. 3, in the event of occurrence data packet discarding in voice data transmission (shown as "x"), voice reconstruction can be made without waiting re-transmission of data from the transmitting side system 10 (shown as "○"). Shown in the lower half of FIG. 3 is an example of forming, in lieu of the above "CODEC (3')", multiplexed CODEC data packet "CODEC (4)/CODEC (3)" with "CODEC (3)" itself used as correction code. In this case, more perfect voice compensation is obtainable.

The CODEC packet need not be limited to such voice codes as G 711, G 722, G723 and G 729, and the present invention is also applicable regarding moving picture CODEC such as H 263 and MPEG 4.

Figure 4:
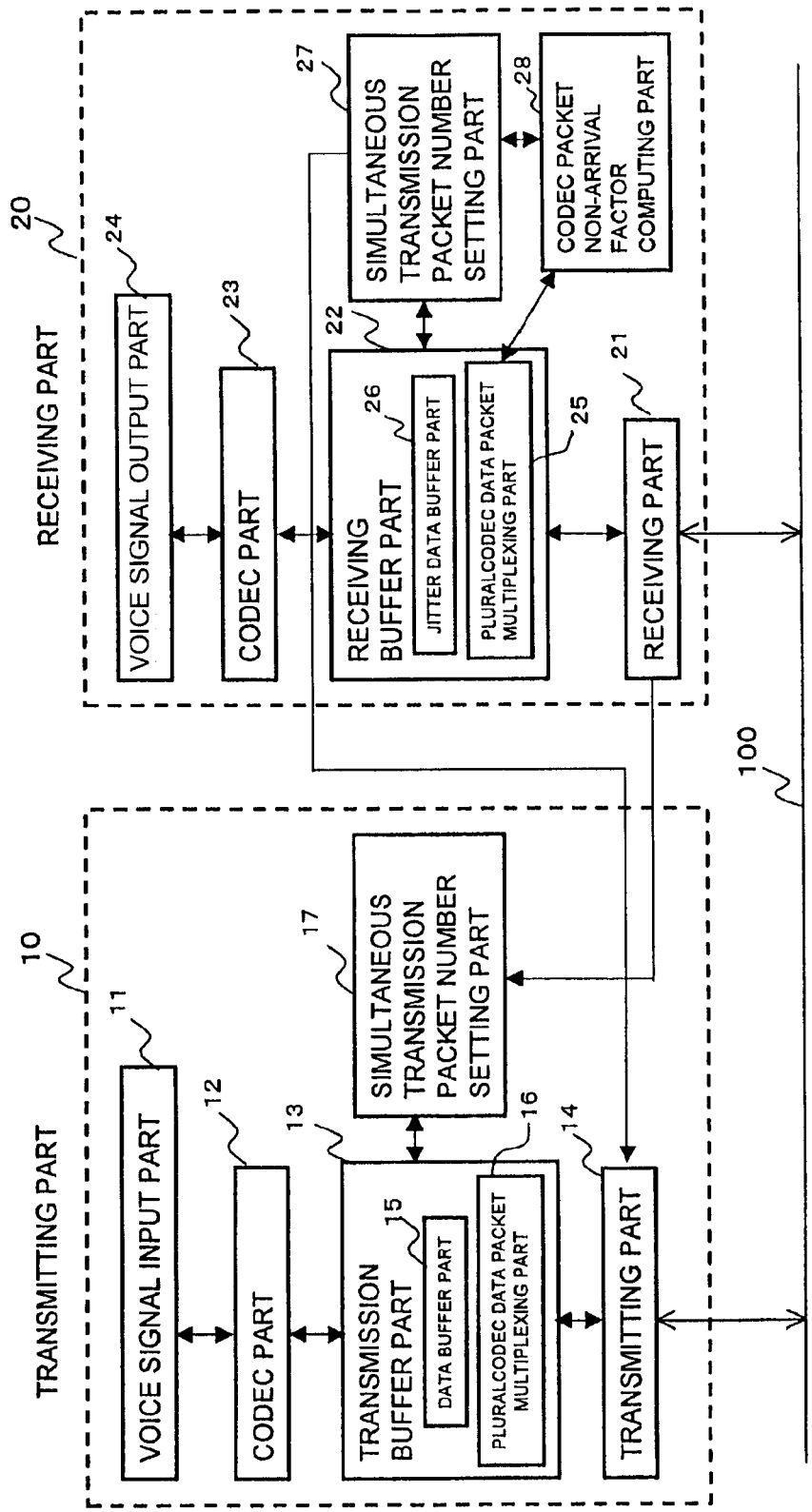
FIG. 4 is a block diagram showing a different embodiment of the present invention.

FIG. 4 is a block diagram showing a different embodiment of the present invention. Parts like those in FIG. 2 are designated by like reference symbols and the not described. In this embodiment, in addition to the same arrangement as the FIG. 2 embodiment, the receiving side system 20 further comprises a CODEC packet non-arrival factor computing part 28. By the term "CODEC packet non-arrival factor" is meant the ratio of the number of data packets, which are processed as data non-arrival regarding CODEC data obtained by sequential rearranging, to the total sent-out packet number. The CODEC data packet non-arrival factor computing part 28 receives data of the number of data packets processed as data non-arrival and the data sent-out data packet number, and computes the CODEC data packet non-arrival factor according to these data.

In this embodiment, the CODEC data packet non-arrival factor computing part 28 computes the non-arrival factor of CODEC packet number, and when the computed value exceeds a predetermined reference value, for instance 5%, it transmits a simultaneous transmission packet number increase request to the simultaneous transmission packet number setting part 17 in the transmitting side system (transmitting part) 10 via the simultaneous reception packet setting part 27.

The above CODEC packet non-arrival factor computing part 28 as described is an example, and more generally the CODEC packet non-arrival factor computing part 28 as a constituent element of the present invention is adapted to transmit the simultaneous transmission packet number increasing/decreasing request to the simultaneous communication packet number setting part 17 in the transmitting side system 10 on the basis of the comparison of the computed non-arrival factor with a predetermined reference value.

The simultaneous transmission packet number setting part 17 in the transmitting part 10, responsive to receipt of the notice of the increasing request (increasing/decreasing), rewrites (increasing/decreasing) the simultaneous transmission packet numbers and informs the success of rewriting (i.e., success notice) via the transmitting part 14 in the transmitting side system 10 to the receiving side system 20. The simultaneous reception packet number setting part 17, responsive to receipt of the success notice, performs setting for increasing (or decreasing) the simultaneous reception packet number. In this way, the simultaneous communication packet number setting part 17 can adaptively adjust the simultaneous reception packet number to a number such that the voice communication success rate is maintained based on changes in the data discarding in the data transmission.

In this embodiment, such a modification is possible that regarding data sent out from the transmitting side system 10, when the degree of failure of the number CODEC packets received as the same time frame in the receiving side system 10 to meet the number of the sent-out CODEC data packets is below a predetermined reference value, a command for decreasing the number of CODEC data packets to be multiplexed is issued as request command to be directed to the transmission side simultaneous transmission packet number setting part 17. For example, when the received packet number is above a value obtained by subtracting "1" from the value preset in the simultaneous transmission packet number setting part, a request for decreasing the simultaneous transmission data packet number is issued to decrease the simultaneously transmitted voice CODEC packets such as to fit the restoration of the communication efficiency. Thus, it is possible to adaptively improve the communication efficiency.

Figure 5:
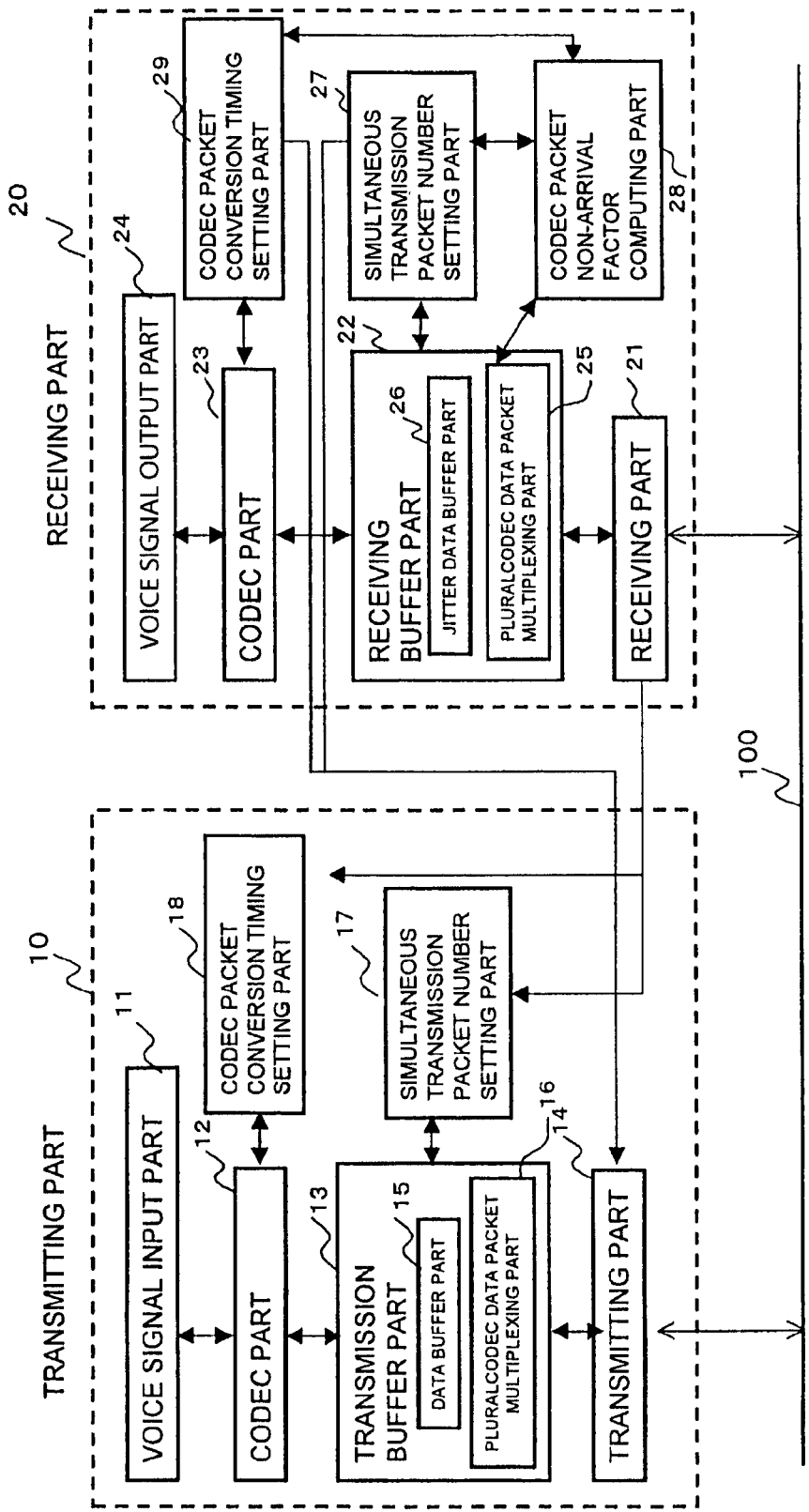
FIG. 5 is a block diagram showing a further embodiment of the present invention.

FIG. 5 is a block diagram showing a further embodiment of the present invention. In the Figure, parts corresponding to those in FIGS. 2 and 4 are designated by like reference numerals and are not described. In FIG. 5, in addition to the arrangement like the FIG. 4 embodiment, the transmitting side and receiving side systems 10 and 20 further comprise CODEC packet conversion timing setting parts 18 and 29, respectively.

In order to decrease the number of transmitted data packets while maintaining the communication quality, the COOEC packet conversion timing setting part 18 and 29 realize a function of decreasing the number of actual data packets as the subject of transmission by adaptively progressively reducing the CODEC data packet conversion time interval from 10 msec. to 20 msec. then to 30 msec. and so forth, for instance.

The CODEC packet non-arrival factor computing part 28 has a table of predetermined weighting functions, for instance, first, time boosting (increasing) request for CODEC packet conversion timing, second, change of the simultaneous transmission packet number to "2", third, tripling of the CODEC packet conversion timing and so forth, and issues a packet conversion timing time setting request to the CODEC packet timing setting part 29 to match the weighting.

The CODEC packet conversion timing setting part 29 receiving the request issues this request to the transmitting side system 10. Specifically, the CODEC packet conversion timing setting part 29 sends out the time setting request to the CODEC packet conversion timing setting part on the side of the transmitting part 10, and when the CODEC packet conversion timing setting part 18 accepts the request, it sends out a time addition reception success time success notice to the side of the receiving part 20. The function of reducing the transmission time by adaptively adjusting the number of data packets to be multiplexed conforms to that in the FIG. 4 embodiment.

Figure 6:
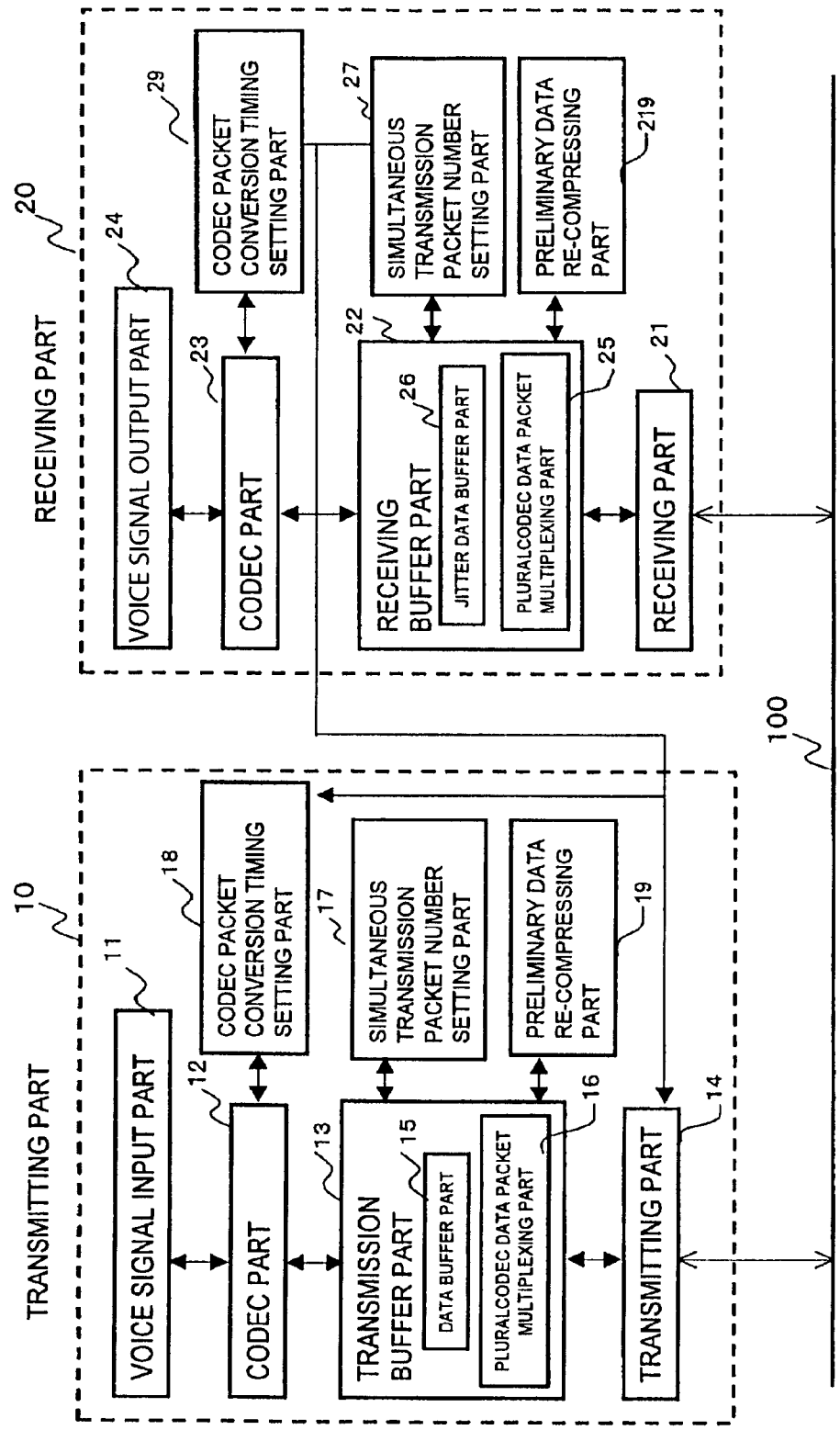
FIG. 6 is a block diagram showing a still further embodiment of the present invention.

FIG. 6 is a block diagram showing a still further embodiment of the present invention. In FIG. 6, parts corresponding to those in the above FIGS. 2 and 4 are designated by like reference numerals and are not described. In the FIG. 6 embodiment, in addition to the arrangement like that of the FIG. 4 embodiment, the transmitting side system 10 further comprises a preliminary data re-compressing part 19, and the receiving side system 20 further comprise a preliminarily data re-compression decoding part 219.

The preliminary data re-compressing part 19 functions to compress the decoding code by providing weights of one packet before, two packets before and three packets before. Specifically, the preliminary data re-compressing part 19 in the communication part 10 provides voice data obtained after the data compression to a plural CODEC data packet multiplexing part 16 in the transmission buffer part 13 with reference to a predetermined table, for instance a table, in which such contents as one pack without any preceding compression factor, two packs with a medium preceding compression factor and three packets each with maximum compression factor are entered. On the receiving side 20, the received data having been compressed in the preliminary data re-compressing part 19 in the above way, is decoded in the preliminarily data re-compression decoding part 219.

Figure 7:
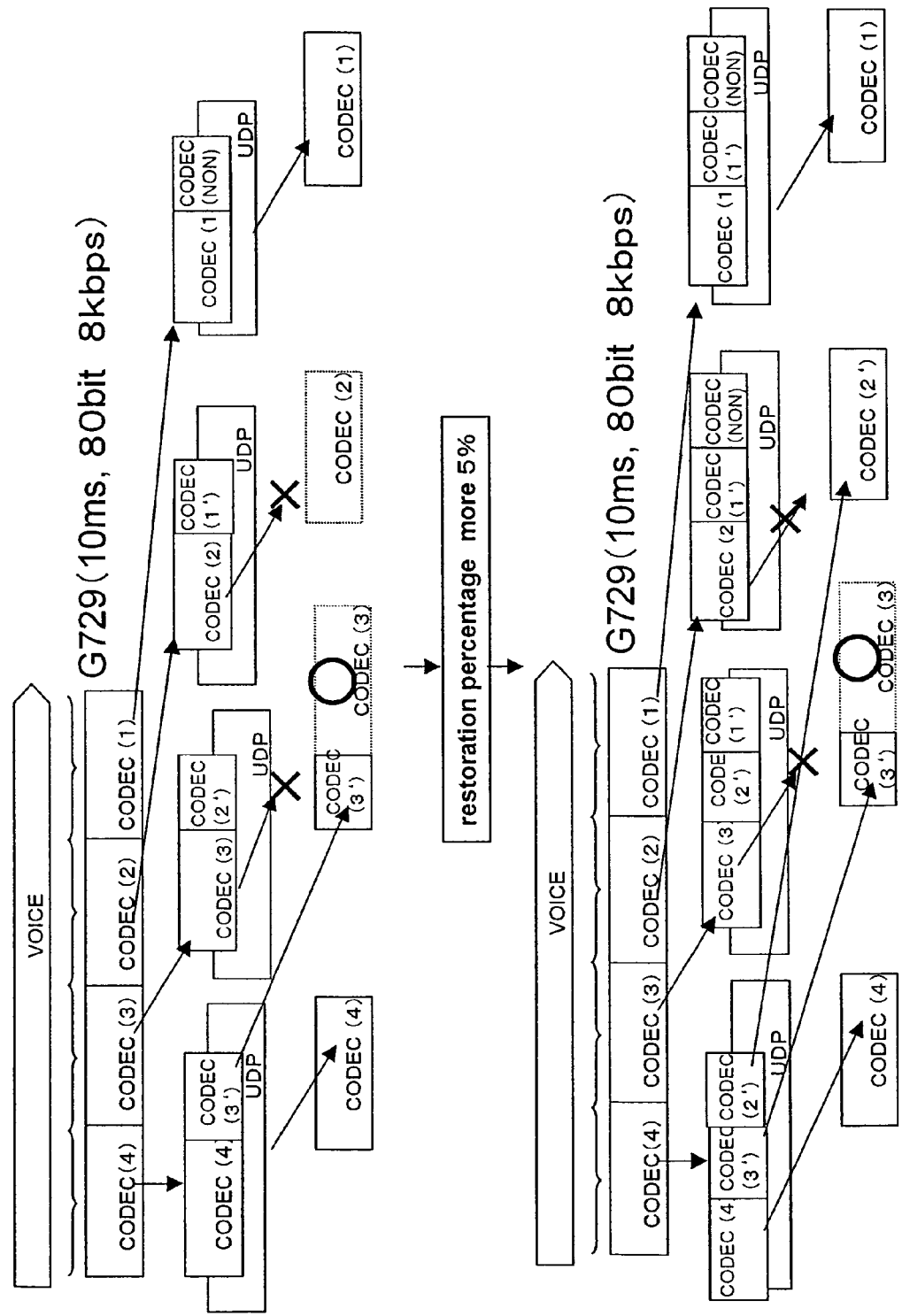
FIG. 7 is a view showing the manner of voice data transmission in the embodiments.

FIG. 7 is a view showing the manner of voice data transmission in the above embodiments. In FIG. 7, the same symbolic representation as in the above cases of FIGS. 1 and 3 is used. What is drawn in the upper half of FIG. 7 is the same as what is drawn in the upper half of FIGS. 1 and 3 and is not described. Shown in the lower half of FIG. 7 is an example, in which with respect to one data packet "CODEC (4)" multiplexed CODEC data packet "CODEC (4)/CODEC (3')/CODEC (2')" formed by adding "CODEC (2')" in a retroactive time section as correction signal to "CODEC (3')" is used in lieu of "CODEC (3')". In this case, two successive lost data packets can be restored. That is, when and only when discarding of three successive data packets occurs, one data packet is lost. Thus, it is possible to obtain more sufficient voice compensation.

In the embodiments described above according to the present invention, the simultaneous transmission data packet number or the CODEC packet conversion timing time are adaptively adjusted based on the CODEC packet non-arrival factor. Thus, in the event of occurrence of data packets in the transmission of CODEC data packet non-arrival voice data (shown as "x"), voice replica is obtainable without waiting transmission of data from the transmitting side system 10 and by securing the QoS standard (shown as "○").

The construction and operation of preferred embodiments of the present invention have been described in the foregoing. However, these embodiments are given merely exemplarily and by no means limitative, and it will be readily understood to the person skilled in the art that changes and modifications may be made to meet specific users without departing from the subject matter of the present invention. For example, it is possible to provide CRC in one CODEC data unit for arrived data change confirmation in assembled CODED units. Also, it is possible to reduce the data error factor or data discarding factor in CRC error by compensating errors in communication by using correction codes with respect to CODED units or units of plural assembled CODEC data. Furthermore, it is possible to send out, after a number of times of one packet data transmission, a plurality of data frames of CODEC data which have been sent out.

According to the present invention, in the event of data discarding a LAN communication method, which permits, in the event of data discarding occurrence, obtaining data replica on the basis of data in the pertinent data packet without waiting re-transmission of the data packets, ensuring high data discarding endurance and maintaining the QoS, and an LAN communication system for executing the same method.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A LAN communication system comprising:
a transmitting side system including:
a voice signal input part for inputting data to be sent out to LAN;
a transmitting side CODEC part that converts a signal representing the data inputted from the voice signal input part to digital codes;
a transmission buffer part including a data buffer part that temporarily stores data packets of the digital codes generated in the transmitting side CODEC part until the CODEC data packet is sent out to the LAN and a plural CODEC data multiplexing part that multiplexes a predetermined plurality of data packets to form transmission data;
a simultaneous transmission packet number setting part that sets the number of data packets to be multiplexed in the plural CODEC multiplexing part in the transmitting side system;
a transmitting part that receives the multiplexed transmission data from the transmission buffer and sends out the received transmission data to LAN; and
a receiving side system including:
a receiving part that receives the transmission data from the LAN;
a reception buffer part including a plural CODEC packet decoding part that develops the multiplexed transmission data received in the receiving part and rearranges the developed data to a continuous data train and a jitter data buffer part for temporarily storing data from the plural CODEC packet decoding part;
a receiving side CODEC part that receives and decodes the digital data from the reception buffer part; and
an output part that reconstructs and outputs the data reconstructed in the receiving side CODEC part;
wherein the receiving side system further includes a CODEC packet non-arrival factor computing part that computes a CODEC packet non-arrival factor as a ratio of the number of CODEC data packets processed as data non-arrival regarding CODEC data obtained by sequentially rearranging in the reception buffer part to the total transmitted CODEC data packet number and transmitting, when the non-arrival factor exceeds a predetermined reference value, a simultaneous transmission packet number change request to the simultaneous transmission packet number setting part in the transmitting side system.

2. A LAN communication system comprising: a transmitting side system including:
an input part for inputting data to be sent out to LAN;
a transmitting side CODEC part for converting signal representing data inputted from the input part to digital signal;
a transmission buffer part including a data buffer part temporarily storing CODEC data packets of digital codes generated in the transmitting side CODEC part and a plural CODEC data multiplexing part for multiplexing a predetermined plurality of CODEC data packets to form transmission data;
a simultaneous transmission packet number setting part for setting the number of CODEC data packets to be multiplexed in the plural CODEC data multiplexing part in response to a request command from a receiving side system corresponding to the transmitting side system; and
a transmitting part for receiving multiplexed transmission data from the transmission buffer part to send to the LAN; and
the receiving side system including:
a receiving part for receiving transmission data from the LAN;
a reception buffer part having a plural CODEC packet decoding part for developing the multiplexed transmission data received from the receiving part, rearranging the sequential order of the developed data packets and rearranging the data packets to forma continuous data train, and a jitter data buffer part for temporarily storing data from the plural CODEC packet decoding part;
a simultaneous reception packet number setting part for setting a number of packets to be dealt with in the plural CODEC packet decoding part as belonging to the same time frame and being received simultaneously, recognizing the number of CODEC data packets to be multiplexed, as set in the simultaneous transmission packet number setting part in the transmitting side system, on the basis of the data received in the receiving part, recognizing the number of CODEC data packets, which are among a plurality of multiplexedly transmitted CODEC data packets and, belong to the same time frame and are actually simultaneously received, on the basis of the data received in the receiving part and, when the degree of failure of meeting of the transmitted CODEC data packet number by the actually received CODED data packets exceeds a predetermined threshold value, issuing a command for reducing the number of CODED data packets to be multiplexed as a request command to be issued to the simultaneous transmission packet setting part on the transmitting side;
a receiving side CODEC part for receiving and decoding digital data from the reception buffer part; and
an output part for reconstructing and outputting data obtained by decoding in the receiving side CODEC part.

3. A LAN communication system comprising:
a transmitting side system including:
an input part for inputting data to be sent out to LAN:
a transmitting side CODEC part for converting signal representing data inputted from the input part to digital signal to form CODEC data and performing conversion to packets in predetermined time intervals;
a transmitting side CODEC packet conversion timing setting part for setting the time interval of packet conversion of CODEC data in the transmitting side CODEC part in response to a request for setting from a receiving side system corresponding to the transmitting side system;

a transmission buffer part including a data buffer part for temporarily storing CODEC data packet of digital codes generated in the transmitting side CODEC part and a plural CODEC data multiplexing part for multiplexing a predetermined plurality of CODEC data packets to form transmission data;

a simultaneous transmission packet number setting part for setting the number of CODEC data packets to be multiplexed in the plural CODEC data multiplexing part in response to a request command from the receiving side system corresponding to the transmitting side system; and a transmitting part for receiving the multiplexed transmission data from the transmission buffer part and sending out the received data to the LAN; and the receiving side system comprising:

a receiving part for receiving multiplexed transmission data from the LAN;

a reception buffer part including a plural CODEC packet decoding part for developing the multiplexed transmission data received in the receiving part, arranging the obtained data packets in sequence order and rearranging these data packets to form a continuous data train, and a jitter data buffer part for temporarily storing data from the plural CODEC packet decoding part;

a simultaneous reception packet number setting part for setting the number of data packets to be dealt with in the plural CODEC packet decoding part as data packets belonging to the same time frame and received simultaneously;

a CODEC packet non-arrival factor computing part for computing the non-arrival factor of CODEC data packet number as the ratio of the number of data packets processed as data non-arrival regarding CODEC data obtained by sequential rearranging in the reception buffer part to the total transmitted data packet number, transmitting, when the non-arrival factor exceeds a predetermined reference value, a request for increasing the simultaneous transmission packet number to the simultaneous transmission number setting part in the transmitting side system, and issuing a packet conversion timing time interval setting request for causing the transmitting side CODEC part to set the CODEC data packet conversion time interval according to the non-arrival factor;

a receiving side CODEC packet conversion timing setting part for issuing, when receiving the packet conversion timing time interval setting request from the CODEC packet non-arrival factor computing part, the setting request to the transmitting side CODEC packet conversion timing setting part;

a receiving side CODEC part for receiving and decoding digital data from the reception buffer part; and an output part for reconstructing and outputting the data obtained by decoding in the receiving side CODEC part.

4. A LAN communication system according to claim 3, wherein the CODEC packet non-arrival factor computing part has an arrangement having a table, which prescribes packet conversion time intervals of applied CODEC data determined based on the non-arrival factor and issuing packet timing time interval setting request according to the table data.

5. The LAN communication system according to claim 3, wherein when the transmitting side CODEC packet conversation timing setting part sets the CODEC data packet conversion time interval in response to a setting request from the receiving side system corresponding to the transmitting side system, it sends out a time setting request reception success information to the receiving side at the success time.

6. The LAN communication system according to claim 3, which further comprises a preliminary data re-compressing part for supplying data obtained by a re-compressing process with a compression factor corresponding to the pertinent data to the plural CODEC data multiplexing part in the transmission buffer part on the basis of a table, in which compression factor to be applied are stored in correspondence to sequence systems of a plurality of CODED data packets, and a preliminary data re-compression decoding part for executing a re-compression decoding process corresponding to the recompression process in the preliminary data re-compressing part on data processed in the plural CODEC data packet decoding part in the reception buffer part.

* * * * *